(12) United States Patent
Rivaton

(10) Patent No.: US 6,283,185 B1
(45) Date of Patent: Sep. 4, 2001

(54) SUPPORTING MEMBRANE FOR TIRE TREAD

(75) Inventor: Renaud Rivaton, Blanzat (FR)

(73) Assignee: Compagnie Générale des Etablissements Michelin - Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/316,544

(22) Filed: May 21, 1999

Related U.S. Application Data

(63) Continuation of application No. PCT/EP97/06237, filed on Nov. 10, 1997.

(30) Foreign Application Priority Data

Nov. 27, 1996 (FR) .................................................. 96 14631

(51) Int. Cl.[7] .............................. B60C 9/22; B60C 17/01; B60C 5/22
(52) U.S. Cl. ..................................... 152/340.1; 152/339.1
(58) Field of Search .............................. 152/339.1, 340.1, 152/331.1, 518, 516

(56) References Cited

U.S. PATENT DOCUMENTS

| 2,253,746 | 8/1941 | Zimmerman . |
| 3,885,614 | 5/1975 | Fujikawa et al. . |
| 4,153,095 | 5/1979 | Sackissian . |

FOREIGN PATENT DOCUMENTS

| 2448315 | 4/1976 | (DE) . |
| 679642 | 9/1952 | (GB) . |

*Primary Examiner*—Adrienne C. Johnstone
(74) *Attorney, Agent, or Firm*—Baker Botts L.L.P.

(57) ABSTRACT

A toric membrane of reinforced rubber, used as a supporting means for the tread of a tubeless tire, and forming with said tire and its mounting rim a traveling assembly, characterized in that, inflated to a pressure po greater than the pressure $p_1$ of the cavity of the tire, it has, in the inflated state, a crown radius $R_M$ less than the loaded radius $R_E$ of the tire used at its recommended pressure, said membrane being reinforced, at least in its crown, by a crown reinforcement and a hooping reinforcement, composed of cords or cables oriented circumferentially.

14 Claims, 4 Drawing Sheets

SUPPORTING MEMBRANE FOR TIRE TREAD

This is a continuation of PCT/EP97/06237, filed Nov. 10, 1997, now WO 98/23457.

BACKGROUND OF THE INVENTION

The present invention relates to a traveling assembly for vehicles, which assembly is intended to be able to travel after a consequent and unexpected loss of pressure of the tire of the assembly, the tire being more particularly either a tubeless tire of the heavy-vehicle type or a tire for a passenger car, the H/B aspect ratio generally being at most equal to 0.8 in both cases. The assembly, apart from the tire and the mounting rim, comprises a supporting means for the tread of the tire when there is a loss of pressure. The invention also relates to the supporting means.

Although tires having a radial carcass reinforcement and crown reinforcement are less and less subject to slow or rapid deflation, and to becoming flat, whatever the cause(s) of said flat, the fact remains that there are still accidents and that a loss of pressure can result in many disadvantages, depending on the position of the tire on the vehicle and the rapidity of deflation. The most widespread disadvantages remain the loss of control of the vehicle, the replacement of the tire under conditions which are not always the most suitable, and practically in all cases deterioration of the properties of the tire, which deterioration may be partial or total.

Many proposals have been made to obtain a traveling assembly which is capable of traveling despite the loss of pressure of the tire of the assembly, and it would be tedious to list all the patent applications and/or patents relating to solutions for the problem. There will be discussed only the conventional, universally known means for solving said problem.

A supporting ring for a tread, which may be of one piece or of several pieces, either formed of a single material, generally a metallic material, or formed of two materials, metal and rubber, possibly being of different geometrical shapes, is inserted into the tire cavity such that the inner wall of the crown of the tire can make contact with the radially upper wall of the supporting ring. One such example of a supporting ring is described in U.S. Pat. No. 5,450,887.

It is also possible to use rings made of foam or cellular material, which under the normal pressure conditions of the tire occupies a certain volume of the tire cavity and which dilates when the internal pressure decreases, until the total volume of said cavity is occupied.

Another solution consists in inserting into the inner cavity of the tire a second, so-called inner tire, having a structure comparable to that of the first tire. The inner tire, which is of smaller dimensions, is then inflated to a pressure greater than the pressure existing in the inner cavity of the first tire, or at least in the free space between the inner wall of the outer tire and the outer wall of the inner tire, such that the outer tire comes to bear on the inner tire in the event of deflation of the outer tire. Japanese application 74/111,303 of Oct. 23, 1974 describes an inner tire of this type.

Whatever the solution adopted, it has disadvantages: a tread supporting ring made of metal or of two materials is costly, heavy and difficult to manipulate despite its lack of height, compared with that of the tire into which it is inserted. It does not enable the tire of the assembly to travel, after deflation, with a deflection compatible with good resistance to internal deterioration of the tire. The same is true of inner tires, which, although less heavy, are just as difficult to handle individually. As for rings of foam or cellular material, they cannot be used for all dimensions of tire because of the high cost of the traveling assembly, while not having any particular advantage from the point of view of assembly and manipulation compared with the use of an inner tire. Quite the contrary, the increase in the internal heating of the tire due to the presence of an inner foam body practically prevents use thereof in a tire of large dimensions.

SUMMARY OF THE INVENTION

In order to be able to use a traveling assembly, formed of an outer tire mounted on its operating rim, and a supporting means for the tread of said tire, when the latter is subject to deflation, said means making it possible to alleviate or even to do away with the disadvantages caused by the known devices referred to above, the invention proposes the use, as a supporting means for a tread, of a toric membrane of reinforced rubber, inflated to a pressure $p_o$ greater than the pressure $p_1$ of the cavity of the tire, and having, in the inflated state, a crown radius $R_M$ less than the loaded radius $R_E$ of the tire used at its recommended pressure, said membrane being reinforced, at least in its crown, by a crown reinforcement formed of at least one ply of cords or cables which are parallel to one another in each ply and form an angle $\alpha$ with the circumferential direction such that $50° \leq \alpha \leq 90°$, said crown of said membrane furthermore comprising a hooping reinforcement composed of at least one ply of cords or cables oriented circumferentially and having a breaking force per cm of ply firstly at least equal to the product of the crown radius $R_M$ and the pressure, per $cm^2$ of surface of said ply, resulting in a tension per cm of ply equivalent to the tension due to the maximum centrifugal force to which the tire can be subjected, and secondly at most equal to the product of the crown radius of said ply and the pressure $p_1$, such that the cords or cables break when the difference in pressure $p_o - p_i$ increases following the decrease in $p_1$.

The breaking force per cm of ply, measured perpendicular to the circumferential cords or cables of the ply, will preferably be the product of the crown radius $R_{M1}$ of said ply and a linear function of the inflation pressure $p_1$ of the tire, the angular coefficient of which is between 0.05 and 0.5 and the ordinate at the origin of which is precisely the corresponding pressure at the maximum centrifugal force. For example, for the range of so-called heavy-vehicle tires, this pressure is selected to be equal to $0.3 \times 10^5$ Pa, whereas for the range of tires for passenger cars this pressure will be $1.2 \times 10^5$ Pa.

The toric membrane may be closed or open. It is said to be closed when the cross-section thereof has a continuous contour, that is to say, one resembling a section of an inflated inner tube; it is said to be open if the contour of its cross-section is discontinuous, for example when the sidewalls of said membrane have ends joined by a suitable means to the beads of the tire into which said membrane is inserted.

The internal pressure po of said membrane, measured in the cold state, that is to say at 20° C., is greater than the pressure $p_1$ of the inner cavity of the tire by a quantity generally between $0.5 \times 10^5$ Pa and $5.0 \times 10^5$ Pa, depending on the dimensions of the tire in question. Given that the crown radius $R_M$ of the toric membrane is preferably between 0.80 and 0.95 times the loaded radius $R_E$ of the tire, mainly for reasons of the heating of said tire, an excessive pressure difference would risk adversely affecting a certain number of properties of the tire itself, for example the strength of the carcass reinforcement of said tire, while requiring an excessively large hooping reinforcement.

The crown reinforcement is preferably formed of two plies of cords or cables which are parallel to one another in each ply and are crossed from one ply to the next, forming an angle of between 50° and 75° with the circumferential direction. The cables or cords are advantageously textile cables or cords for reasons of lightness, flexibility and good corrosion resistance, and are preferably of aromatic polyamide. The axial ends of the two plies are preferably located in the sidewalls of the membrane, such that, if S is the maximum axial width of the carcass reinforcement of the tire, the width of the plies is preferably between S and 1.30 S.

The toric membrane, according to the invention, may comprise sidewalls each reinforced by at least one ply of radial cords or cables. It may also comprise, radially above the crown reinforcement/hooping reinforcement assembly, a rubber supporting strip, said strip possibly being provided with elements in relief, of a height of at least 14 mm and defined by circumferential and/or transverse recesses or grooves opening on to the lateral edges of said strip. The role of such recesses or grooves is to permit the flow of the inner inflation gas when the tire actually bears on the toric membrane and to reduce the susceptibility of the membrane to perforation during travel after loss of pressure in the tire.

It is advantageous for the elements in relief on the supporting strip to be substantially frustoconical and to form circumferential rows of blocks. This preferred form of blocks on the strip permits a greater volume of recesses, and more homogenous flow of the inflation gas and distribution of the temperatures of said gas.

The flow and distribution are all more homogenous because the sidewalls can be provided advantageously with radial grooves opening on to the metal mounting rim of the tire.

The presence of recesses and circumferential rows makes possible another advantage, because if the hooping reinforcement can be incorporated in the toric membrane and form an integral part of said membrane, that is to say, for example arranged over and/or under the crown reinforcement, it is preferably located on the radially outer face of the supporting strip and is in the form of an axially discontinuous ply and formed of several bands of several circumferential textile cables of widths substantially equal to the widths of the recesses or grooves between rows of elements in relief on the supporting strip and arranged in said recesses or grooves, independently of the supporting strip. This hooping structure makes possible, when the inner cavity of the tire is without inflation gas and after rupture of the circumferential cables of the bands due to the increased pressure differential, more rapid and more complete expansion of the toric membrane.

DESCRIPTION OF THE DRAWINGS

The characteristics and advantages of the invention will be better understood with the aid of the following description, which refers to the drawings, illustrating examples of embodiment in non-limitative manner, in which.

DESCRIPTION OF PREFERRED EMBODIMENTS

Figure 1A:
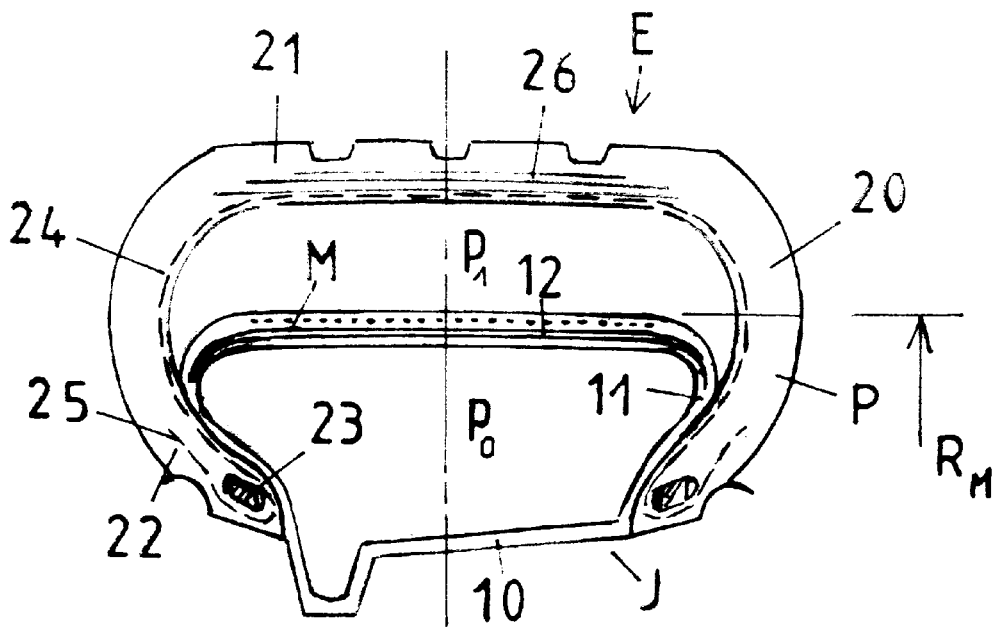
FIGS. 1A and 1B show diagrammatically, in a radial plane perpendicular to the ground, the diametrically opposed meridian sections of an assembly according to the invention, when the tire is deflected under load and traveling under normal conditions.

In FIG. 1A, the assembly E is composed of the tire P, of dimension 495/45-R-22.5 in the example described, the mounting rim J, and the toric membrane M according to the invention. The tire P is a universally known tire, with sidewalls 20 joined radially on the outside to a tread 21 and extended radially on the inside to two beads 22, each bead 22 being reinforced by at least one bead wire 23 around which a radial carcass reinforcement 24 is anchored to form an upturn 25. The carcass reinforcement 24 is surmounted radially in the crown by a crown reinforcement 26, composed of at least two plies of metal cords or cables which are parallel to one another in each ply and crossed from one ply to the next, forming an angle which may be between 5° and 45° with the circumferential direction. The tire P is referred to as tubeless, and comprises on the inside a layer of rubber mix which is impermeable to the inflation gas.

The rim J, referred to as 17.00×22.5, on which the tire P is mounted, is a rim of known type.

Figure 1B:
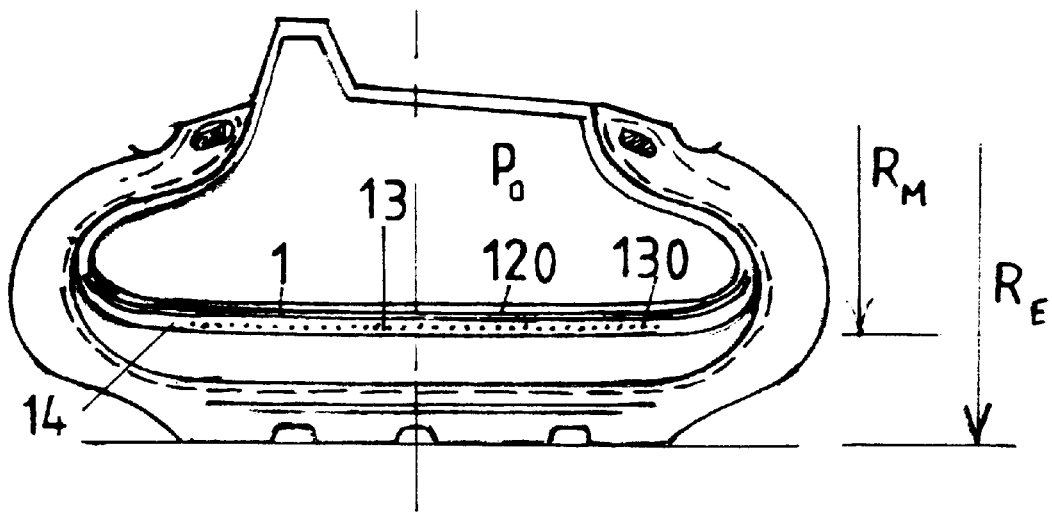

As for the toric membrane M according to the invention, in the example described it is closed and reinforced at its crown 1. Of constant thickness over its radially inner part 10 and on its sidewalls 11, it is thicker at the crown 1 and is reinforced firstly by a crown reinforcement 12 composed of two plies 120 of polyester cables, which are parallel to each other in each ply with a density corresponding to 102 cables per dm, and crossed from one ply to the next, forming an angle of 60° with the equatorial line XX' of the assembly. The width of the plies is greater than the maximum axial width of the tire by about 6%. This crown reinforcement 12, which is readily expandable, is associated with a hooping reinforcement 13, radially on the outside in the example described and composed of a single ply 130 of cables oriented circumferentially, said cables being made of aromatic polyamide and formed of three cords of 330 tex, and laid with a density of 10 cables per dm. Said ply of cables has a curve of tensile force per cm of ply (perpendicular to the direction of the cables) as a function of the relative elongation $F\ cm=f(\epsilon)$ having a relatively high slope for a force of between 0 and the breaking force of 145 daN per cable. The ply 13 of circumferential cables thus defined performs the function of hooping the membrane M, firstly against the stresses due to centrifugal force and secondly against the stresses due to the pressure differential $p_o-p_1$, $p_o$ being the inflation pressure of the toric membrane M which is equal to $9.5\times10^5$ Pa, and $p_1$ being the pressure of the tire P which is equal to $9.0\times10^5$ Pa. Said hoping function enables the membrane M to maintain, under normal conditions of travel of the assembly, that is to say under the loading, pressure and speed conditions recommended for the tire in question, a radius RM which is practically constant and less than the loaded radius RE of the tire P (FIG. 1B representing the loaded part of the assembly under normal conditions of travel).

Figure 2A:
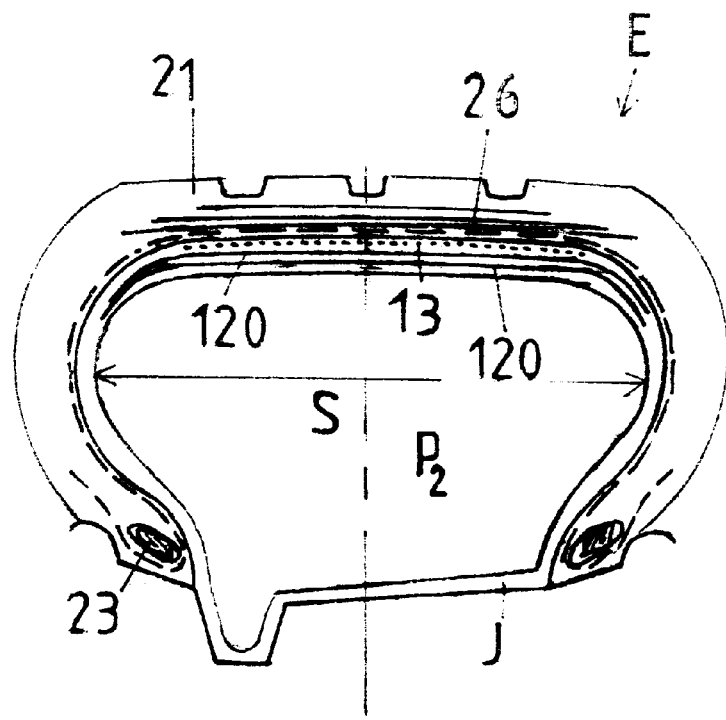
FIGS. 2A and 2B show diagrammatically, in the same manner as in FIG. 1, the meridian sections of the assembly subjected to travel after loss of pressure.
Figure 2B:
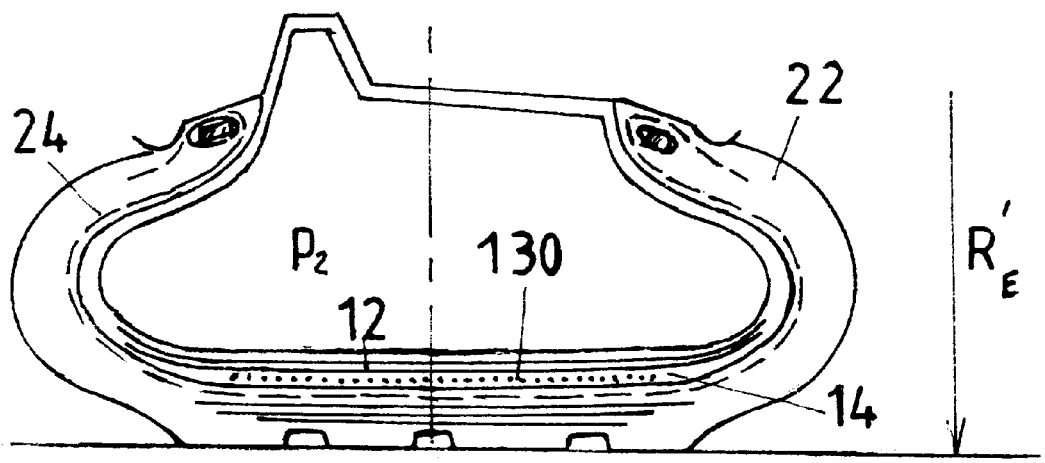

The membrane M is completed by covering the hooping reinforcement 13 with a layer of rubber mix 14 of low thickness of 0.6 mm. It is advantageous, in order to avoid perforation of the toric membrane, to arrange a layer of semi-pasty and self-sealing product within the latter. When the tire P loses internal pressure, slowly or suddenly, and whatever the reason for said loss of pressure ($p_1$ decreases), the pressure differential $p_o-p_1$ becomes such that the cables of the ply 130 break and thus permit expansion of the toric membrane M until it completely occupies the cavity of the tire P (FIGS. 2A and 2B). Since the increase in volume involves a reduction in the initial internal pressure $p_o$ of the membrane M, the traveling assembly operates at a lower pressure $p_2$, resulting in a loaded radius $R'_E$ when traveling in deteriorated mode (FIG. 2B) which is less than the loaded radius $R_E$ during normal travel (FIG. 1B). The radius $R'_E$ however permits travel at moderate speed until the next service area without major deterioration of the tire P, and without human intervention, at which service area it is then possible to supply the additional pressure required in order to obtain a radius very close to the radius $R_E$ and to permit travel under conditions which are practically normal, although the speed of the vehicle has to be reduced slightly owing to the substantially greater heating of the assembly.

It goes without saying that such a safety system can be used in conjunction with a system which provides information to the dashboard of the vehicle for indicating to the driver the tire which has lost air.

Figure 3:
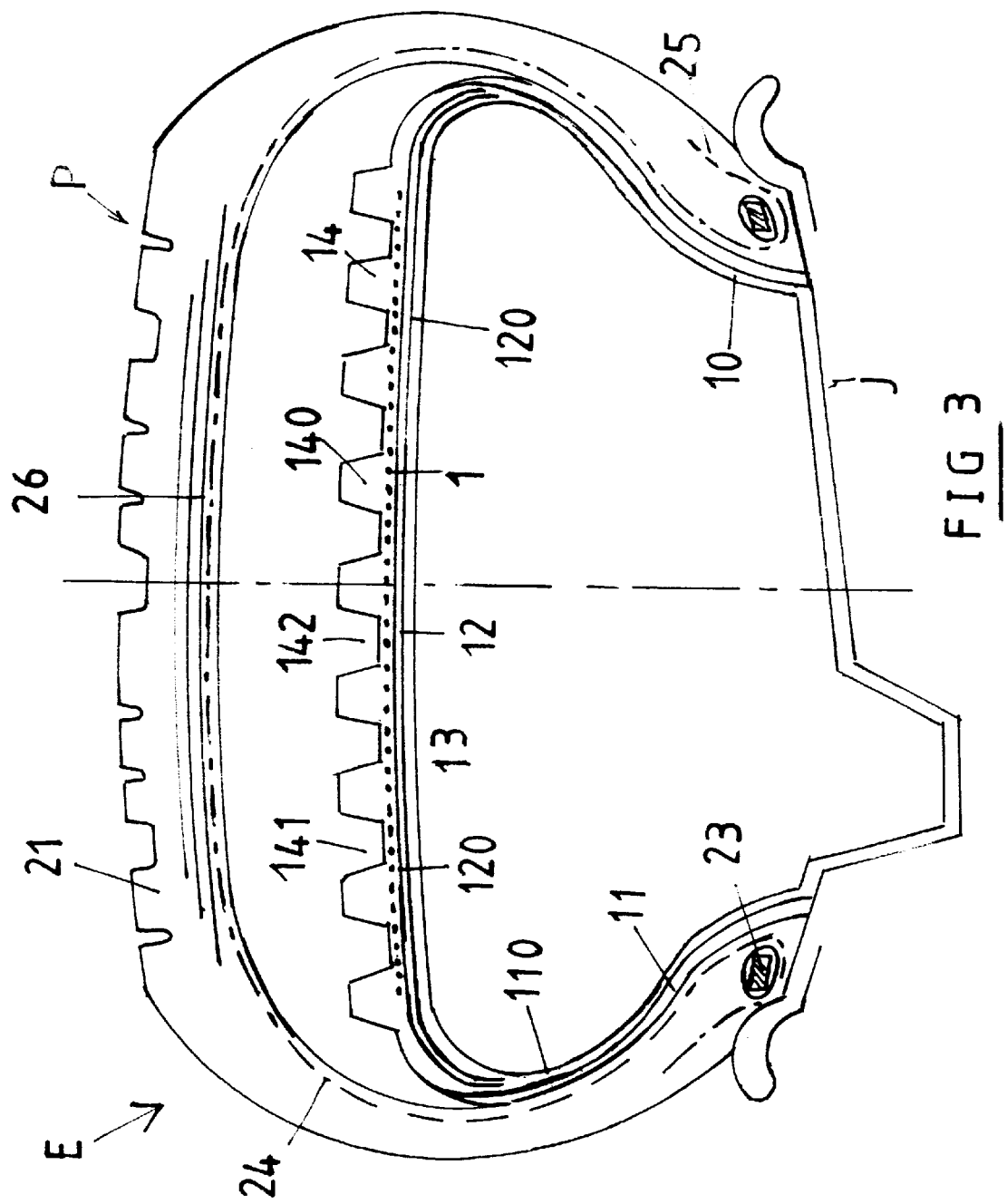
FIG. 3 shows diagrammatically, viewed in meridian section, a traveling assembly according to the invention in a first preferred variant.

The variant of toric membrane M illustrated in FIG. 3 differs from the membrane shown in FIGS. 1 and 2 in the following respects:

a) The layer 14 of rubber mix covering the crown and hooping reinforcements is distinctly thicker, this thickness being equal to 21 mm. It is furthermore profiled, provided with circumferential grooves 142 on one band and transverse grooves 141 on the other hand, said grooves defining blocks of rubber 140 between them. These grooves have a depth h of 20 mm, and a width of between 10 mm and 14 mm;

b) The sidewalls 11 of the membrane are also thickened and grooved by radial recesses 110, said recesses occupying a surface substantially comprising between 40% and 60% of the total surface of the sidewalls 11, and opening on to the metal rim J of the assembly E, which permits better conductance of the heat produced towards the rim J and better loss of said heat.

Figure 4:
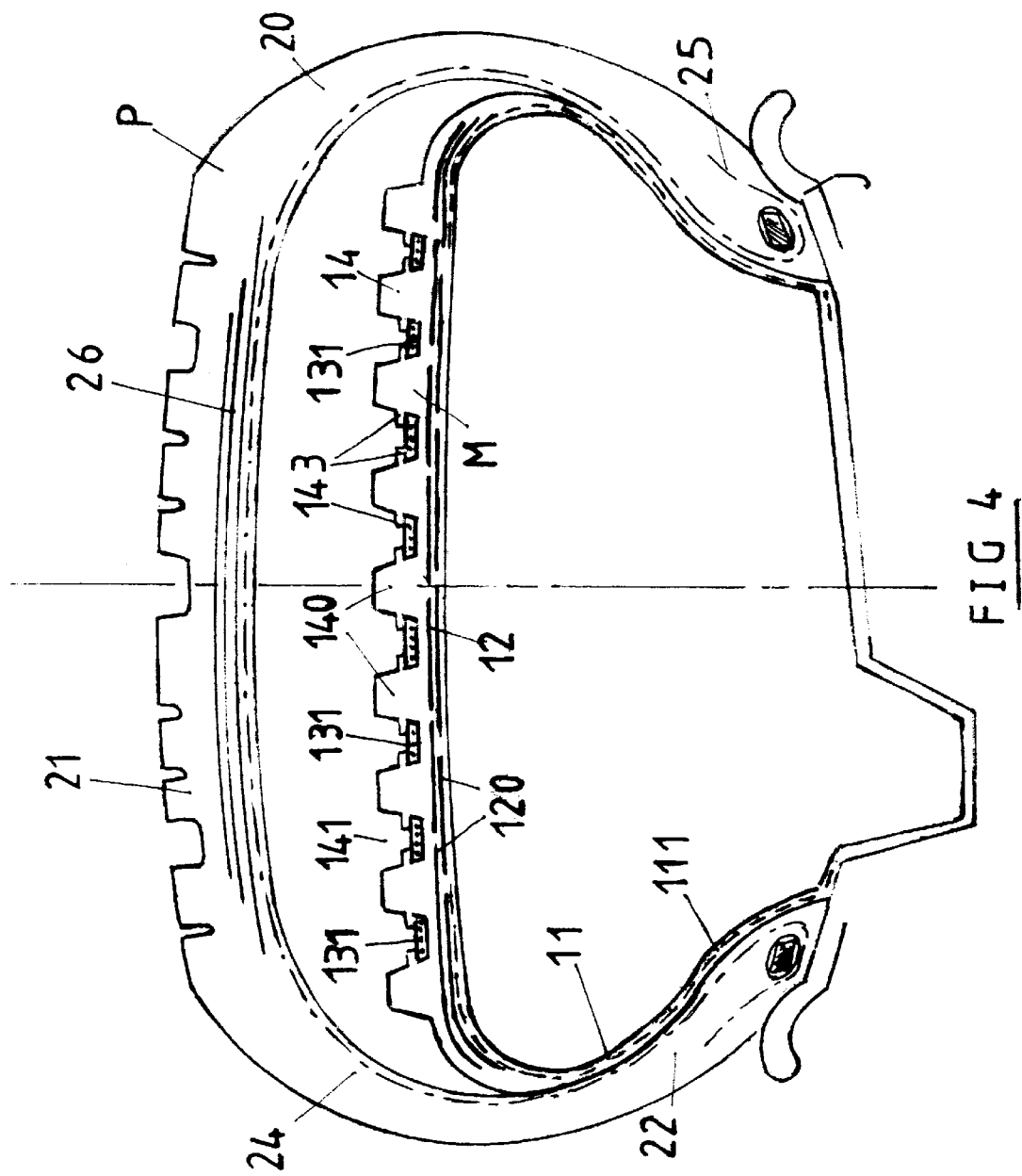
FIG. 4 shows diagrammatically, viewed in meridian section, an assembly in a second preferred variant.

The closed toric membrane M shown in FIG. 4, inserted into the same tire P as previously, also comprises a crown 1 reinforced by two plies 120 of crossed cables, a covering layer or strip 14, and sidewalls 11. It has the following special features:

1) The tread 14 is provided with frustoconical elements in relief 140 which are separated from one another by recesses 141. These frustoconical "studs", which might also be circumferential, continuous elements in relief, are provided laterally with protrusions or lugs 143 of small dimensions, and form circumferential rows on the surface of the tread 14, such that:

2) Between two rows of axially adjacent studs 140 there is arranged a hooping band 131 of circumferential cables, having a breaking force per cm of at most 600 daN. The number of bands 131, equal to the number of axial gaps between rows of studs 140, functionally replaces the ply 130 shown in FIG. 3. The bands 131, being on the outside of the membrane M proper, as in the case of covered cables, prevent the occurrence of multiple breaks, the basic advantage being that these bands 131 not only permit greater mileage in the deflated mode but also the reuse of the membrane M after replacement of said bands 131. The lugs 143 make it possible to keep said bands 131 in place in the gaps between rows of studs, firstly during the positioning operation of the membrane in the tire and secondly upon breaking of the circumferential cables of the strips.

3) As the membrane M in this example is intended to be reused several times, each sidewall 11 of said membrane is reinforced by a ply 111 of radial cables, the radially upper end of said ply being radially on the inside of the end of the crown reinforcement 12 of said membrane.

The supporting means for the tread after deflation of the tire can utilize different ways of controlling the inflation and deflation operations of the tire on the one hand and of the membrane on the other hand. It is possible to use two valves, one permitting inflation of the membrane M, the other being connected to a flexible tube passing into the cavity of the membrane M and opening into the tire cavity. This second valve may also discharge the inflation air into one of the radial recesses 110 provided on the sidewalls 11 of the membrane M.

I claim:

1. A toric membrane of reinforced rubber, used as a supporting means for the tread of a tubeless tire, and forming with said tire when mounted on its mounting rim a traveling assembly which makes it possible to travel when said tire is subject to a loss of internal pressure, the toric membrane having a crown and being characterized in that, inflated to a pressure $p_o$ greater than the pressure $p_1$ of the cavity of the tire, it has, in the inflated state, a crown radius $R_M$ less than the loaded radius $R_E$ of the tire used at its recommended pressure, said membrane being reinforced, at least in its crown, by a crown reinforcement formed of at least one ply of cords or cables which are parallel to one another in each ply and form an angle α with the circumferential direction such that $50° \leq \alpha \leq 90°$, said crown of said membrane furthermore comprising a hooping reinforcement composed of at least one ply of cords or cables oriented circumferentially and having a breaking force per centimeter width of hooping reinforcement, firstly at least equal to the product of the crown radius $R_M$ and the pressure, per square centimeter of surface of said hooping reinforcement, resulting in a tension per centimeter width of hooping reinforcement equal to the corresponding tension at the maximum centrifugal force to which the tire can be subjected, secondly at most equal to the product of the crown radius of said hooping reinforcement and the pressure $p_1$, such that the cords or cables of said hooping reinforcement break when the difference in pressure $p_o-p_1$ increases following the decrease in $p_1$.

2. A toric membrane according to claim 1, in which the toric membrane is closed, its cross-section having a continuous contour.

3. A toric membrane according to claim 1, in which the hooping reinforcement of circumferentially oriented cords or cables has a breaking force per centimeter width equal to the product of the crown radius of said hooping reinforcement and a linear function of the inflation pressure $p_1$ of the tire, the angular coefficient of which is between 0.05 and 0.5 and the ordinate at the origin of which is the value of the corresponding pressure at the maximum centrifugal force.

4. A toric membrane according to claim 3, in which for the range of so-called heavy-vehicle tires, the ordinate at the origin of the linear function is equal to $0.3 \times 10^5$ Pa.

5. A toric membrane according to claim 3, in which the crown reinforcement is formed of two plies of textile cords or cables made of aromatic polyamide which are parallel to one another in each ply and crossed from one ply to the next, forming an angle of between 50° and 75° with the circumferential direction.

6. A toric membrane according to claim 5, in which the membrane includes sidewalls and the axial ends of the two plies are located in the sidewalls of the membrane, such that, if S is the maximum axial width of the carcass reinforcement of the tire, the width of the plies is between S and 1.30 S.

7. A toric membrane according to claim 6, comprising, radially above the crown reinforcement/hooping reinforcement assembly, a rubber supporting strip provided with rows of elements in relief of a height of at least 14 mm and defined by circumferential and/or transverse recesses opening on to the lateral edges of said strip.

8. A toric membrane according to claim 7, in which the elements in relief of the supporting strip are substantially frustoconical and form circumferential rows of blocks or studs.

9. A toric membrane according to claim 7, in which the elements in relief of the supporting strip are provided laterally with protrusions or lugs.

10. A toric membrane according to claim 7, in which the hooping reinforcement is located on the radially outer face of the supporting strip, and is in the form of an axially discontinuous ply formed of several bands of several circumferential textile cables, of widths substantially equal to the widths of the recesses between rows of elements in relief of the supporting strip and arranged in said recesses independently of the supporting strip.

11. A toric membrane according to claim 1, in which the hooping reinforcement is integrated in the crown of the membrane.

12. A toric membrane according to claim 1, in which the sidewalls of the membrane are reinforced by at least one ply of radial cords or cables.

13. A toric membrane according to claim 1, in which the sidewalls of the membrane are provided with radial grooves which open on to the metal mounting rim of the tire, and permit the flow of gas.

14. A traveling assembly for vehicles, which is intended to be able to travel after a consequent and unexpected loss of pressure of a tire of the assembly, said tire being a tubeless tire of the heavy-vehicle type, the H/B aspect ratio of which is at most equal to 0.8, and comprising, in addition to the tire, a mounting rim and a toric membrane of reinforced rubber, the toric membrane having a crown and being characterized in that, inflated to a pressure $p_o$ greater than the pressure $p_1$ of the cavity of the tire, it has, in the inflated state, a crown radius $R_M$ less than the loaded radius $R_E$ of the tire used at its recommended pressure, said membrane being reinforced, at least in its crown, by a crown reinforcement formed of at least one ply of cords or cables which are parallel to one another in each ply and form an angle $\alpha$ with the circumferential direction such that $50° \leq \alpha \leq 90°$, said crown of said membrane furthermore comprising a hooping reinforcement composed of at least one ply of cords or cables oriented circumferentially and having a breaking force per centimeter width of hooping reinforcement, firstly at least equal to the product of the crown radius $R_M$ and the pressure, per square centimeter of surface of said hooping reinforcement resulting in a tension per centimeter width of hooping reinforcement equal to the corresponding tension at the maximum centrifugal force to which the tire can be subjected, secondly at most equal to the product of the crown radius of said hooping reinforcement and the pressure $p_1$, such that the cords or cables of said hooping reinforcement break when the difference in pressure $p_o-p_1$ increases following the decrease in $p_1$ and in which the internal pressure $p_o$ of the membrane measured in the cold state, that is to say at 20° C., is greater than the pressure $p_1$ of the inner cavity of the tire by a quantity of between 0.05 and 0.50 $p_1$.

* * * * *

UNITED STATES PATENT AND TRADEMARK OFFICE
CERTIFICATE OF CORRECTION

PATENT NO. : 6,283,185 B1
DATED : September 4, 2001
INVENTOR(S) : Renaud Rivaton It is certified that error appears in the above-identified patent and that said Letters Patent is hereby corrected as shown below:

Title page,
Item [57], ABSTRACT,
Line 4, "po" should read -- $p_0$ --

Column 2,
Line 37, "$p_0$-$p_i$" should read -- $p_0$-$p_1$ --
Line 59, "po" should read -- $p_0$ --

Column 3,
Line 21, "relicf," should read -- relief, --

Column 4,
Line 61, "RM" should read -- $R_M$ --.
Line 62, "RE" should read -- $R_E$ --

Signed and Sealed this

Seventeenth Day of December, 2002

JAMES E. ROGAN
*Director of the United States Patent and Trademark Office*